United States Patent [19]

Brown

[11] Patent Number: 4,630,058

[45] Date of Patent: Dec. 16, 1986

[54] SATELLITE COMMUNICATION SYSTEM

[75] Inventor: Irving Brown, Cherry Hill, N.J.

[73] Assignee: RCA Corporation, Princeton, N.J.

[21] Appl. No.: 352,882

[22] Filed: Feb. 26, 1982

[51] Int. Cl.[4] .......................................... H01Q 3/00
[52] U.S. Cl. .................................. 342/359; 342/352; 342/356
[58] Field of Search ............... 343/352, 355, 356, 358, 343/359, 353, 426, 354

[56] References Cited

U.S. PATENT DOCUMENTS

| 3,341,151 | 9/1967 | Kampinsky | 244/1 |
| 3,534,364 | 10/1970 | Burford | 343/100 |
| 3,541,553 | 11/1970 | Gubin | 343/354 |
| 3,772,701 | 11/1973 | Wilkinson | 343/359 X |
| 4,247,857 | 1/1981 | Wilcke et al. | 343/426 |
| 4,263,539 | 4/1981 | Barton | 343/359 X |
| 4,315,262 | 2/1982 | Acampora et al. | 343/352 |
| 4,355,313 | 10/1982 | Hubert | 343/352 X |

Primary Examiner—Theodore M. Blum
Assistant Examiner—John B. Sotomayor
Attorney, Agent, or Firm—Joseph S. Tripoli; Robert L. Troike

[57] ABSTRACT

A beacon signal is radiated from both the communications antenna and from a separate beacon antenna, the latter having a broader radiation pattern than the communications antenna pattern and overlapping the communications antenna pattern. The radiated signals are sensed at ground stations located about the periphery of a desired communications antenna radiation pattern coverage area on earth to provide sensor signals proportional to the ratios of the amplitudes of the two signals. The sensor signals are compared with one another to provide an error signal indicative of any departure of the communications antenna pattern from said desired coverage area. A control system in the satellite is responsive to this error signal for maintaining the communications antenna radiation pattern directed to the desired coverage area on earth as, for example, by controlling the attitude of the satellite.

6 Claims, 5 Drawing Figures

SATELLITE COMMUNICATION SYSTEM

This invention relates to a communication satellite system and more particularly to a radio communication system wherein an orbiting radio relay satellite is equipped with an antenna which beams signals over a given geographical area to ground stations in the geographical area.

Various systems have been proposed heretofore which employ orbiting satellites as relay stations in the transmission of radio signals from one point to another on the earth. The most practical and low-cost method of achieving communication satellites is to place these communication satellites in the geosynchronous orbit at about 22,300 miles from the earth's surface and about the equator so that the orbit time approximates that of the earth's rotation and the satellite appears stationary from the earth and hovering over a given region. By various means, such as the use of a momentum wheel and exchange of momentum, a platform containing an antenna can be positioned so that the antenna continuously faces the earth and the desired coverage region.

In geosynchronous communication satellites, weight and power limitations dictate that the satellites antenna coverage pattern be shaped and pointed to fit as closely as possible the predetermined area of the earth's surface which is to be served by the satellite. In-orbit errors, disturbances, or distortions which change the pattern shape or move it away from the desired location, should either be minimized by design, if possible, or compensated by in-flight corrections. A less desirable alternative is to enlarge the antenna pattern to take into account the effects of all these factors; but this reduces the overall gain, a loss which must be made up by increasing satellite power output and, correspondingly, satellite weight.

The errors, disturbances, or distortions are the result of or affected by (1) attitude determination and control errors, (2) external torques acting on the spacecraft, (3) thermal distortions, and (4) choice of communication frequency band. The antenna assembly is mounted to the body of the spacecraft whose attitude in orbit is controlled relative to a set of coordinate axes. The mounting may be either rigid or by means of a deployable joint. Either way, any error in sensing pitch, or roll, of the spacecraft or its position relative to a desired location, will cause the antenna boresight, and hence the entire pattern, to shift away from the desired location on the earth. As well, any error in controlling these body axes or orbit position in response to the sensed errors will cause the same shift.

External forces such as solar pressure or attitude control thrusting can produce boresight shifts by rotating the body away from its desired attitude or moving the satellite from its desired position in orbit.

A communication satellite is subject to temperature changes as its exposure to the sun changes during its orbit or as its internal power dissipation changes. These changes occur slowly and predictably; the solar inputs change both diurnally and seasonally, and the internal power dissipation changes occur by ground command. Under normal operating conditions, the solar effects are the dominant ones. During eclipse seasons (at the vernal and autumnal equinox periods) additional, more abrupt, changes occur as the satellite moves into and out of the earth's shadow. The effect of these changes on the satellite antenna pattern can be twofold. First, it can distort the spacecraft structure, and thereby can shift the relative orientation of the attitude sensor mounting planes from each other and from the antenna itself, thereby disturbing the orthogonality of the reference axes. This can cause errors either within the attitude control loop or in antenna pointing relative to the sensor axes. Second, they can disturb the dimensional relationships within the antenna elements, which can cause both boresight shift and antenna pattern distortion. The magnitude of these dimensional changes depends on the antenna design itself, and to what extent it is shielded from thermal effects.

At higher communication frequency bands, it is generally desirable to provide increased antenna gain in order to offset the increased path loss. But as gain is increased, the gain gradient at the edge of the beam magnifies all of the above effects.

The usual design approaches to reduce errors, disturbances and distortions (e.g., by increasing sensor and attitude control loop accuracy or by stiffening structural members to minimize the effect of temperature changes) have a practical limit because they require added weight. Moreover, it is very difficult, if not impossible, to confirm the results by test before launch, because of the practical difficulties of measuring the effect of small disturbances on antenna ranges.

According to one embodiment of the present invention, a method for minimizing the above errors is achieved by comparing the received signals at ground stations located near the periphery of the desired beam and changing the position of the satellite antenna to compensate for these errors.

In the drawings:

FIG. 1 diagrammatically illustrates the principal components of a typical communication system constructed in accordance with the present invention, and which comprises a relay satellite, a transmitting ground station, and a plurality of receiving ground stations.

Figure 1:
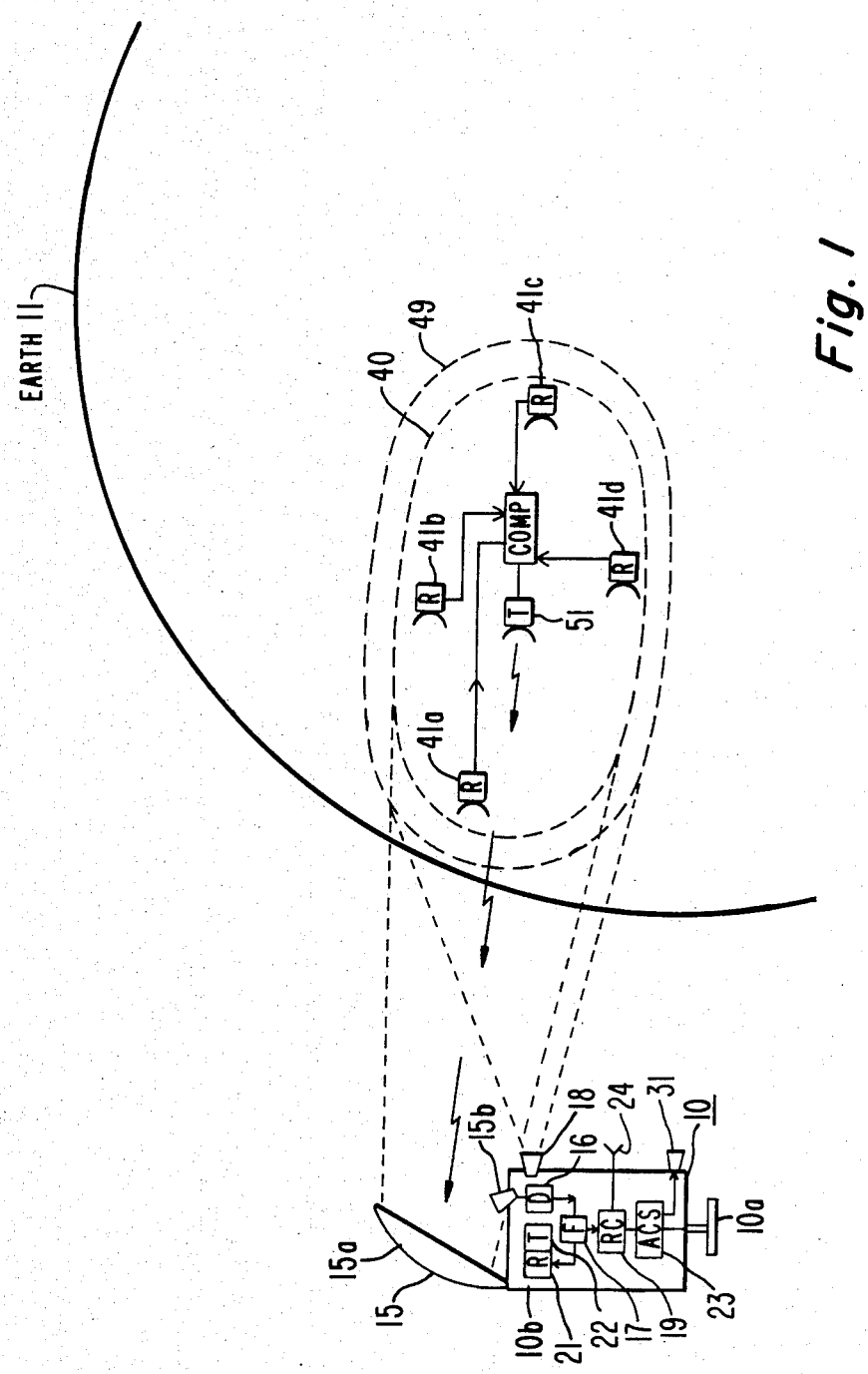

Referring to FIG. 1, the satellite 10 is orbiting earth 11 where, for example, the satellite 10 is in the geostationary orbit about the earth. The satellite 10 includes a momentum wheel 10a and a despun body 10b. Fixed on the despun body 10b is a first antenna 15 including a parabolic reflector 15a and radiator horns 15b which are mounted on the satellite despun body 10b. For a spectrum reuse case, for example, the antenna includes the parabolic reflector 15a which has horizontal wires on one surface and vertical wires on an opposite surface or two separate parabolic reflectors with one reflector having horizontal wires behind the other with vertical wires. The feed horn radiator 15b for this spectrum reuse case may include separate vertically and horizontally polarized feed horns. See, for example, U.S. Pat. No. 3,898,667 of Raab, assigned to the assignee of the present application and incorporated herein by reference. The satellite may further include for operation as a relay, a receiver 21 and transmitter 22 coupled to the horns 15b where the transmitter portion is represented by block 22 and the receiver by block 21. Signals are received, for example, at an up-link frequency ($f_U$) of 14 GHz and are transmitted at a down-link frequency ($f_D$) of 12 GHz. Signals received by the antenna 15 are applied to receiver 21 via frequency selective diplexer 16 and frequency selective filter 17 and converted and amplified and retransmitted back to earth via transmitter 22 all as is conventional in a satellite relay. The communications receiver 21 is not used to receive signals indicative of attitude error. Instead, this function is provided by a command receiver 19 which is a normal part of the satellite system. The command receiver 19 is tuned to a frequency adjacent to, but outside of, the communication frequency band. The command receiver input is connected to both the communications antenna horns 15b, and to an omni-antenna 24 (also called a "command and telemetry antenna") and may receive signals via either path. Signals which are detected at the command receiver 19 by means of, for example, the filter 17, indicative of the attitude errors of the satellite or antenna pointing errors of the satellite, are coupled from the receiver 19 to the attitude control system 23 which processes the signals and applies the appropriate attitude control signals to, for example, thrusters as represented by element 31 to provide attitude correction or to a momentum wheel 10a, to provide attitude correction, or in the other alternative to a magnetic torquing system as described, for example, by L. Muhlfelder et al., in U.S. Pat. No. 4,062,509. The antenna system 15 is configured such that when the satellite is in proper position, it radiates to a given coverage area represented by dashed lines 40 in FIG. 1. In accordance with the system contained herein, at the periphery of the desired, radiation coverage area represented by dashed line 40, there are located receiver ground stations 41a, 41b, 41c and 41d representing, for example, the west, north, east and south perimeters, respectively, of the coverage area.

The satellite system also includes a second antenna system that includes a broad beam horn antenna 18 which generally points toward earth and radiates generally to the same region covered by pattern 40 but over a generally broader region that includes that produced by the expected errors as represented by dashed lines 49. The antenna at peripheral stations 41a through 41d are also generally responsive to the broader beam pattern 49 from antenna 18. The signals from the stations 41a, 41b, 41c and 41d are compared to detect any shifts in the pattern and if a shift occurs that requires correction, a signal representing the correction is transmitted from the transmitter 51 back to be received at the directive antenna 15 or the omni-antenna 24, detected at the command receiver 19 and applied to the attitude control system 23. The latter then applies the appropriate pitch and roll bias corrections which restore the satellite to its desired orientation such that the antenna is providing the desired coverage over the region indicated by dashed line 40.

Figure 2:
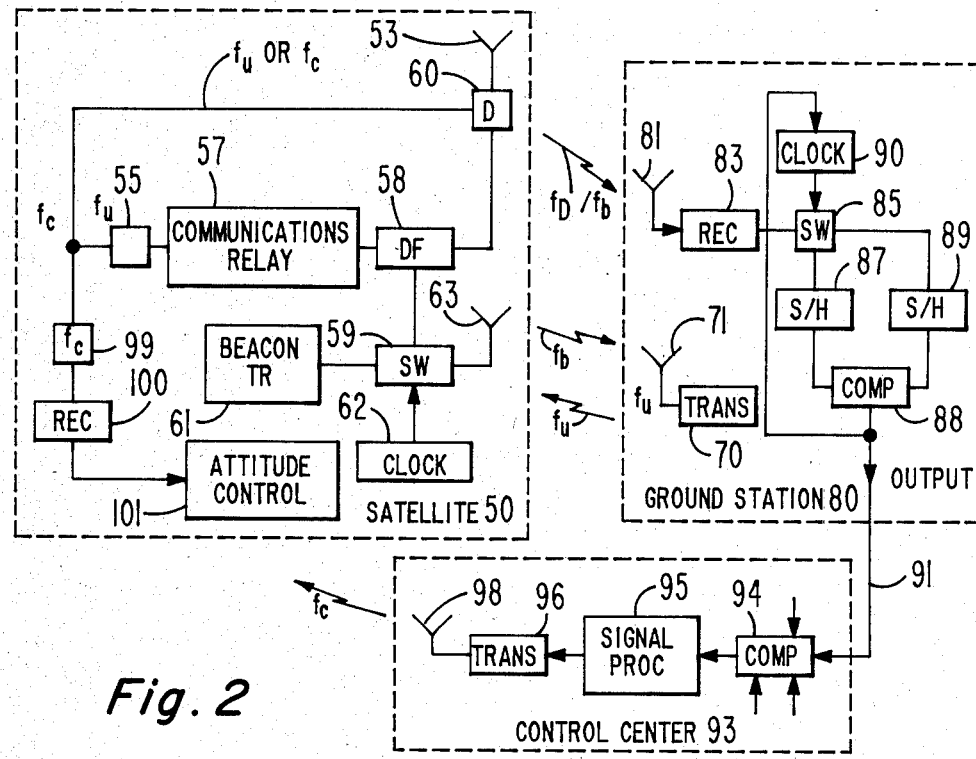
FIG. 2 is a block diagram of the system of FIG. 1 in accordance with one embodiment of the present invention.

FIG. 2 provides a more detailed illustration of an embodiment of the present invention. Multichannel signals from a ground station transmitter 70 are radiated via a transmitting antenna 71, over a band of frequencies centered at an up-link frequency $f_U$, toward the satellite 50. At the satellite 50 the up-link signals centered at $f_U$ are picked up via satellite antenna 53 and applied via diplexer 60 and an up-link frequency filter 55 to communication relay network 57. The communication relay network 57 receives the multichannel signals, separates the signals into separate channels, amplifies them and converts them to a down-link frequency, and then applies them via directional filter 58 and diplexer 60 to antenna 53 which may or may not include the same parabolic reflector such as reflector 15a in FIG. 1. The signals from the communications relay network 57 are transmitted down-link at a frequency centered at $f_D$. At the satellite 50 is included a beacon transmitter 61 and a separate broad beam radiator 63 like that of the horn radiator 18 in FIG. 1. The beacon signal is represented by frequency $F_b$. In accordance with this one embodiment, a clock signal from clock source 62 is fed to switch 59 and the beacon signal is also applied to switch 59. Periodically the clock signal switches the beacon transmitter 61 output from radiator 63 to the communications antenna 53 so that there is from antenna 53 the down-link frequency $F_D$ and, when clocked, frequency $F_b$. At each of the peripheral ground stations, such as ground station 80 in FIG. 2 which may be one of stations 41a, 41b, 41c or 41d in FIG. 1, the antenna 81 receives the beacon signal $f_b$ from communications antenna 53 and the beacon signal $f_b$ from radiator 63. The received beacon signal $f_b$ is processed at the receiver 83 and applied via switch 85 to either one of the sample-and-hold (S/H) circuits 87 or 89 under control of the clock 90. When the beacon signals are being transmitted via the broad beam antenna 63, the clock 90 operates the switch 85 at the ground station such that a sample of the beacon signal amplitude is stored in sample-and-hold circuit 89. When the beacon signals are being radiated via communications antenna 53, the signals received at receiver 83 via the antenna 81 are amplitude sampled and stored at sample-and-hold circuit 87. The amplitude levels of these two signals are compared at comparator 88 to produce an output sensor signal proportional to the ratio of the two signals. The switching period of clock 90 is synchronized to that of clock 62 by, for example, timing the latter to provide unequal switching periods between horn 63 and antenna 53; this inequality allows clock 90 to differentiate the transmission via horn 63 from that via antenna 53 by means of a feedback from comparator 88 to clock 90. The output signals from comparator 88 are then transmitted via leads 91, for example, to a central satellite control center 93 where these sensor signals are compared at comparator 94 with the sensor signals from the other peripheral sites, such as three other sites in FIG. 1, to determine, via signal processor 95, any requirement for correction of the satellite or the antenna due to the shifting of the communication antenna beam from its desired area indicated by dashed line 40 in FIG. 1. If, for example, the ratio of amplitude levels of all four comparisons are the same, this indicates that the satellite is properly positioned and oriented and operating in its optimum mode, but if one boundary has a larger ratio or discrepancy between the signal from the beacon antenna and the received signal from the communications antenna, this indicates a shift of the communication antenna away from the region of the ground station and an attitude correction is required to move the communication antenna to provide optimum coverage. The signal processing 95 in response to an output signal from comparator 94 indicative of this shift, generates appropriate attitude correction signals in pitch and roll which may be modulated onto a carrier wave $f_C$ at transmitter 96 and radiated via antenna 98 to the satellite 50. At the satellite 50, the signal $f_C$ may be picked up, for example, by antenna 53 and passed through filter 99 to the receiver 100 (which is shown in FIG. 1 as 19) which detects the attitude correction signals and applies them to the attitude control system 101 (or 23 in FIG. 1) of the satellite to alter the attitude of the satellite by means of thrusters 31 (see FIG. 1) or the momentum wheel 10a or a magnetic torquer to thereby adjust the attitude of the satellite and consequently the antenna and its pattern so as to place the pattern again so that the coverage area is as indicated by dashed line 40. It is recognized that the antenna 15 may be adjustably mounted relative to the satellite body 10b and in such case the adjustments are made in the position of the antenna relative to the satellite rather than to the attitude control systems of the satellite.

Figure 3:
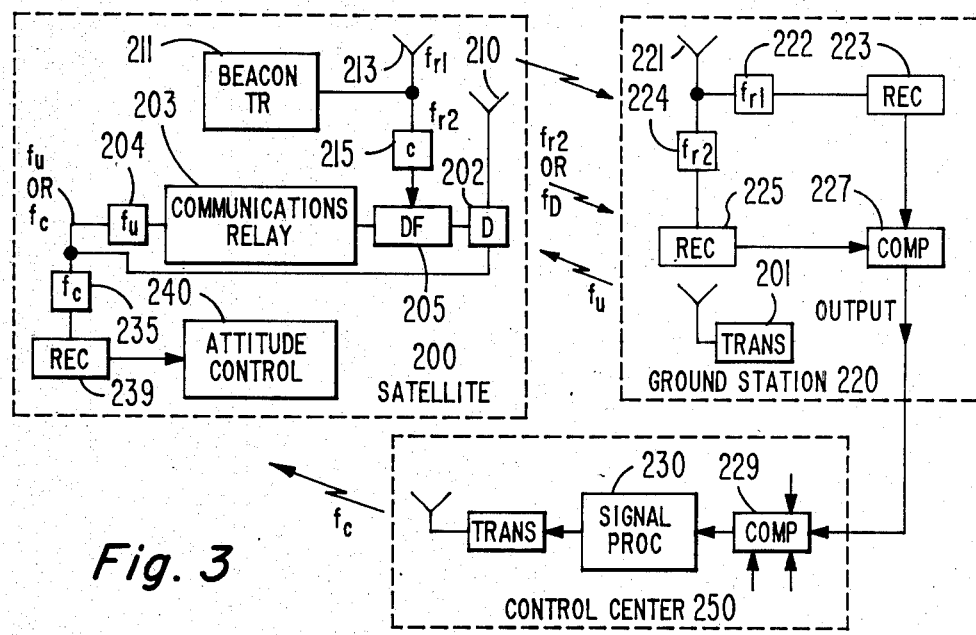
FIG. 3 is a block diagram of a system in accordance with another embodiment of the present invention.

FIG. 3 illustrates another embodiment of the present invention. Multichannel signals from the ground transmitter 201 are transmitted over a band of up-link frequencies centered at $f_U$ to the satellite 200. The signals are picked up at the satellite communications antenna 210 which may be like that of antenna 15 in FIG. 1 and applied via diplexer 202 and $f_U$ bandpass filter 204 to the communication relay network 203 which receives the signals and splits the signals into separate channels. These signals are then amplified and converted to the down-link frequency $f_D$ and recombined and applied through directional filter 205 and diplexer 202 to the communications antenna 210. In addition, the satellite 200 includes a beacon transmitter 211 which transmits a beacon frequency of $f_{r1}$ via a beacon antenna 213 which may be like the horn antenna 18 in FIG. 1. In addition, equal beacon transmitter signals are converted to a second offset frequency $f_{r2}$ via offset frequency converter 215 and applied to directional filter 205. Thus, transmitter signal $f_{r2}$ is radiated via the communications antenna 210 and the same beacon signal at an offset frequency $f_{r1}$ is simultaneously radiated from beacon antenna 213. Each of the perimeter ground stations 220 includes a pickup antenna 221 which couples received signals to receivers 223 or 225. The beacon signals at frequency $f_{r1}$ are coupled via $f_{r1}$ bandpass filter 222 to receiver 223. The $f_{r2}$ frequency beacon signals are coupled to receiver 225 via $f_{r2}$ bandpass filter 224. The two offset frequency beacon signals (one transmitted from the beacon antenna 213 and the other from the communications antenna 210) are compared at comparator 227 and signals representing the ratio of the two signals are coupled via leads to the satellite control center 250 where these signals are compared at comparator 229 to the other perimeter ground stations to detect if there has been an appreciable shift of the beam and in which direction. This detected shift is processed by processor 230 to derive attitude control signals which are modulated on a transmitter carrier at up-link frequency $f_C$ and radiated to the satellite 200. At the satellite 200, the signals $f_C$ are picked up at antenna 210 and coupled via $f_C$ pass filter 235 to receiver 239 which detects these attitude control signals and the appropriate attitude control signals are applied to attitude control unit 240 to change the attitude of the satellite to correct the errors.

It is necessary that the measurements of the RF down-link signal at the several ground stations be an accurate indication of pattern change only; that is, the signal should either be free of signal strength variations due to other causes, or else such variations should be common to all the measurement sites. For this reason, it is not feasible to use the communication RF carriers since, in general, they may be subject to up-link variations, and the several stations may be tuned to different carriers. In the embodiment of FIG. 2, a separate beacon signal from transmitter 61 is transmitted from a satellite via the communications antenna 53 and the separate beacon antenna 63 (or horn 18 in FIG. 1) for comparing the change in communication antenna gain. At the ground station 80 in the system of FIG. 2 the signal levels from the two antennas are compared at comparator 88. The broad-beam pattern from the horn antenna 63 in FIG. 2 is relatively unaffected by antenna pointing error and therefore can serve as a reference, but the signals transmitted from the communications antenna 53 in FIG. 2 will vary if the pattern shifts. Since both signals originate at a common source and are of the same frequency, they are equally affected by the link losses and fades when they are received at a common receiver 83. The comparison of the relative amplitude at the receiver 83 in FIG. 2 provides a direct indication of the pattern shift. The means in FIG. 2 to distinguish the two signals is to provide time separation by transmitting an alternating sequence of switching between the two antennas 53 and 63.

The arrangement of FIG. 3 distinguishes the two signals sent from the communications antenna and the beacon by means of frequency separation. Converter 215 in the satellite 200 provides an offset frequency $f_{r2}$ from that transmitted by the beacon horn of $f_{r1}$. The second RF carrier $f_{r2}$ derived from the $f_{r1}$ from the beacon transmitter is transmitted via the communications antenna 210 periodically. At the station 220, the $f_{r1}$ and $f_{r2}$ signals are compared to sense the relative amplitude ratio between the signals from the communication antenna and signals from the beacon antenna to provide a direct indication of pattern shift. The frequencies $f_{r1}$ and $f_{r2}$ are made close to one another so they are generally equally affected by link losses and fades. By the method described above, the effect of all variables except antenna gain itself are minimized or eliminated. The result is a gain ratio not the absolute gain.

A measurement at any one earth terminal determines only the magnitude of the signal change, not the direction of the pattern shift which caused it. But combined with similar measurements at the other earth terminals, at comparator 94 in FIG. 2, for example, and 229 in FIG. 3, the direction of pattern shift easily can be sensed.

Figure 4:
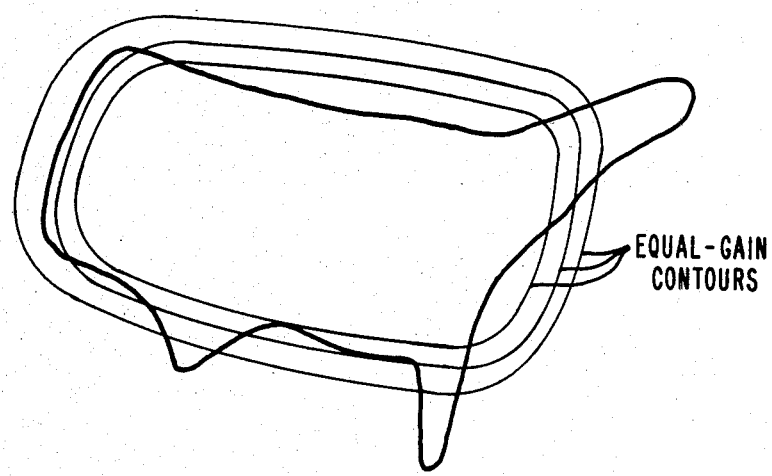
FIG. 4 illustrates equal gain contours over a coverage region.
Figure 5:
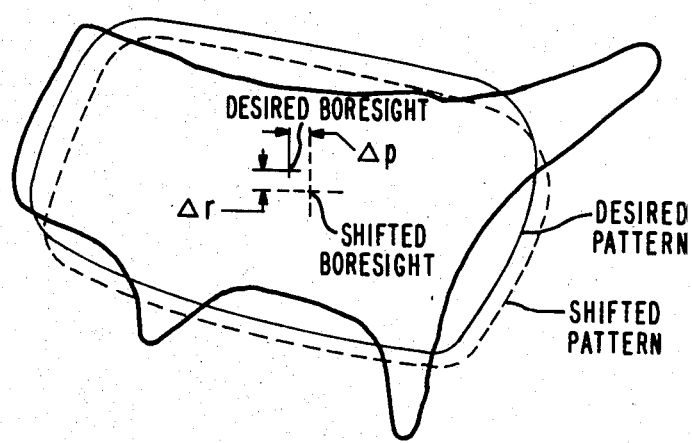
FIG. 5 illustrates desired and shifted patterns and antenna pattern correction by roll and pitch correction where $\Delta r$ is roll correction and $\Delta p$ is pitch correction.

Prior to launch, the antenna gain of the communications antennas are measured and the results are plotted as equal gain contours as a function of angle from either boresight or satellite nadir. It is common practice to superimpose these contours on maps of the earth, as seen from the satellite as shown in FIG. 4. The predicted gain and gain gradient at any selected earth latitude/longitude is thus apparent. To determine the actual in-orbit pattern, it is necessary to perform an initial in-orbit calibration as follows. The satellite is commanded to roll and pitch by means of deliberate offsets introduced into the satellite attitude control system. This causes the antenna beam to "scan" the earth. One specific earth station can then measure the relative signal strength as a function of roll and pitch angles from the satellite nadir. Since the measurements are made at a single earth terminal, it is possible to relate the measurements directly to the predicted antenna pattern. Thus, an in-orbit model of the antenna pattern is obtained and it serves as the reference for all later measurements. It is not significant if this model contains distortion errors since it is used only as a reference. Moreover, as subsequent in-orbit operation indicates that an update of this model will provide a better reference, it is modified or updated. In subsequent operations, if a shift in the pattern occurs, it will be sensed by all the measurement sites as an apparent change in antenna gain. Based on this data, the shifted location of the pattern may be determined, for example, by a duplicate acetate overlay which is moved to correspond to the measured values. The antenna gain pattern is thus fitted to the new data, and the resultant angular shift in boresight angle is determined. The data is converted to equivalent pitch and roll bias corrections which would restore the satellite antenna to its desired location. This concept is illustrated in FIG. 5. If the operation and control doctrine of the communication satellite system requires that the above processes be automated (e.g., if the communication earth terminals are unmanned) the system is implemented by collecting and transmitting data by either the satellite or by land line, and computing roll and pitch corrections at signal processor 94 or 230 at the Satellite Control Center. Several ways to accomplish this are: (1) digitize the measured data at the communication terminal and transmit it periodically, upon request; (2) measure, digitize and store the data, together with time tags at the communication terminal and transmit it to the control center upon request. The latter method allows the system to function in non-real time.

At the Satellite Control Center, the data from all the sites is inputted to a computer and grouped by time. Since the variations are slow, it is not necessary that the measurements be made simultaneously. The stored program at the Satellite Control Center contains the predicted gain and gain gradients expressed as partial derivatives with respect to roll and pitch or with respect to local latitude and longitude. Either way, these values are taken from the measured antenna pattern determined by the in-orbit calibration described above. Given a set of time-grouped measurements, the computer then solves for roll correction and pitch correction, as a best fit to restore the shifted pattern to its desired location.

It can be shown analytically that the effect of spacecraft yaw errors in normal operation are minimal compared to roll and pitch. Therefore, they are neglected in the attitude control correction process.

For an automated system the signal processors 95 or 230 may include a computer which stores a program which is a measure of relative signal strengths as a function of deliberate roll and pitch offsets to produce a reference gain and gain gradients at one antenna site to given partial derivatives of roll and pitch. This stored program is compared with a newly measured antenna pattern to produce the roll and pitch correction signal which restores the pattern to its desired location.

What is claimed is:

1. A method of maintaining a geosynchronous satellite communication radiation pattern of a first signal, transmitted from a communication satellite antenna, positioned so that it covers a predetermined area on earth including multiple ground stations comprising:
   radiating a beacon signal from a second satellite antenna in a beam pattern which covers an area substantially larger than and including all of said predetermined area;
   sensing at each of a plurality of said ground stations located in and distributed about the periphery of the predetermined area the ratio between the received beacon signal and the received first signal to provide ground station sensor signals proportional to said ratios;
   comparing with one another only said sensor signals produced by said peripheral ground stations to sense the error, if any, in the position of said communications radiation pattern relative to said predetermined area; and
   changing the attitude of said satellite in response to said error signal to correct for said pattern error.

2. In a communication satellite system including a communication relay and a communications antenna on a satellite for radiating signals in a beam pattern over a predetermined desired coverage area of the earth including multiple ground stations, a system for controlling the direction in which the beam pattern is radiated comprising:
   a second satellite antenna characterized by having a beam pattern which covers an area substantially larger than and including all of said predetermined area; means including a transmitter for applying signals to said communications antenna and to said second antenna whereby said signals are radiated from both said communications antenna and said second antenna;
   a plurality of communication antenna sensors on the ground located in and about the periphery of said predetermined area, each responsive to said signals radiated from said communications antenna and said second antenna for providing a sensor signal proportional to the ratio of the amplitudes of the signals it receives from said communications antenna and said second antenna;
   means for comparing said sensor signals with one another to provide an error signal indicative of the error of said pattern over said predetermined area on earth; and
   means on the satellite responsive to said error signal for reorienting said communications antenna to correct for said error.

3. In a communications satellite system including a communications antenna providing signals of a predetermined radiation pattern, a system for maintaining said pattern over a predetermined area on earth including multiple ground stations comprising:
   said satellite including a beacon antenna and transmitter means for supplying a beacon signal to said beacon antenna, said beacon antenna radiating said beacon signal over an area of the earth including all of said predetermined area and extending beyond said area;
   a plurality of communication sensors located in and about the periphery of said area on earth, each providing a sensor signal proportional to the ratio of the amplitude of the signal it receives from said communications antenna to the amplitude of the signal it receives from said beacon antenna;
   means for comparing with one another only said sensor signals from the peripheral sensors to provide an error signal indicative of the error of said pattern over said predetermined area on earth; and
   means responsive to said error signal for reorienting said communications satellite antenna to correct for said error.

4. The combination claimed in claim 3 wherein said beacon signal from said beacon transmitter means is translated into a second beacon signal at an offset frequency wherein one of said beacon signals is radiated via a beacon antenna and the other is radiated via the communicaions antenna, and each of said plurality of sensors includes an antenna ground station which separately processes the beacon signals from the communications antenna and the beacon antenna and compares the same for producing a signal proportional to the ratio of the amplitudes of the two signals.

5. In a communication satellite system including a satellite having a communications antenna for providing signals of a predetermined radiation pattern, an attitude control system responsive to error signals for reorienting said satellite, a transmitter and receiver for processing communication signals from earth and reradiating these signals via the communications antenna and for receiving ground commands from a ground station for reorienting said satellite, a system for maintaining said pattern over a predetermined area on earth including multiple receiver ground stations comprising:

said satellite system including a beacon signal generator and a beacon antenna and means for coupling said beacon signal to said communications antenna and to said beacon antenna radiating said beacon signal over an area of the earth including all of said predetermined area and extending beyond said area;

a plurality of said receiver ground stations located at the periphery of said area on earth, each for providing a sensor signal proportional to the ratio of the amplitude of the signal it receives from said communications antenna to the signal it receives from said beacon antenna; and means for comparing said sensor signals only from said plurality of peripheral ground stations to provide an error signal indicative of the error of said pattern over said predetermined area on earth to said attitude control system to thereby orient said communications satellite to correct for said error.

6. In a communication satellite system including a communications antenna on a satellite for radiating signals in a beam pattern over a predetermined desired coverage area of the earth a system for controlling the direction in which a beam pattern is radiated from said communications antenna comprising:

a second satellite antenna characterized by having a beam pattern which covers an area substantially larger than and including all of said predetermined area;

means including a transmitter for applying signals to said communications antenna and to said second antenna;

a plurality of ground stations located in and about the periphery of said predetermined area, each ground station including means for receiving said signals radiated from said communications antenna and said second antenna and means for providing a first signal corresponding to the amplitude of the signal it receives from the communications antenna and a second signal corresponding to the amplitude of the signals it receives from the second antenna;

means responsive to said first and said second signals received at each peripheral ground station in said plurality for providing from each one of said peripheral ground stations in said plurality a sensor signal proportional to the ratio of the amplitude of said first signal to the amplitude of said second signal;

means for comparing said sensor signals associated with different ones of said peripheral ground stations in said plurality to provide when appropriate an error signal indicative of the error of said pattern over said predetermined area on earth; and means on said satellite responsive to said error signals for orienting said communications antenna to correct for said error.

* * * * *

UNITED STATES PATENT AND TRADEMARK OFFICE
CERTIFICATE OF CORRECTION

PATENT NO. : 4,630,058
DATED : December 16, 1986
INVENTOR(S) : Irving Brown

It is certified that error appears in the above-identified patent and that said Letters Patent is hereby corrected as shown below:

Column 7, line 65, cancel "at" and insert -- for --.

Signed and Sealed this

Twenty-seventh Day of October, 1987

*Attest:*

DONALD J. QUIGG

*Attesting Officer*    *Commissioner of Patents and Trademarks*